United States Patent [19]

Nelson

[11] Patent Number: 5,258,145
[45] Date of Patent: Nov. 2, 1993

[54] METHOD FOR MANUFACTURING A HIGH RESOLUTION STRUCTURED X-RAY DETECTOR

[75] Inventor: Robert S. Nelson, San Diego, Calif.

[73] Assignee: The United States of America as represented by the Secretary of the Navy, Washington, D.C.

[21] Appl. No.: 766,697

[22] Filed: Sep. 27, 1991

[51] Int. Cl.⁵ .................... B29C 71/04; C09K 11/06
[52] U.S. Cl. ........................... 264/21; 264/22; 264/129; 264/138; 313/469; 313/474
[58] Field of Search ............... 264/21, 22, 129, 138; 313/469, 474

[56] References Cited

U.S. PATENT DOCUMENTS

| | | | |
|---|---|---|---|
| 3,041,456 | 6/1962 | MacLeod | 313/469 |
| 3,344,276 | 9/1967 | Balding . | |
| 3,852,133 | 12/1974 | Houston | 264/129 |
| 3,936,645 | 2/1976 | Iverson . | |
| 4,362,946 | 12/1982 | Cusano et al. | 264/21 |
| 4,437,011 | 3/1984 | Noji et al. . | |
| 4,465,728 | 8/1984 | Haigh et al. | 264/129 |
| 4,533,489 | 8/1985 | Utts et al. . | |
| 4,560,882 | 12/1985 | Barbaric et al. . | |
| 4,626,739 | 12/1986 | Shmulovich | 313/469 |
| 4,654,290 | 3/1987 | Spanjer | 264/22 |
| 4,672,207 | 6/1987 | Derenzo . | |
| 4,695,762 | 9/1987 | Berkstresser et al. | 313/474 |
| 4,831,262 | 0/0000 | Goveart et al. . | |
| 5,075,195 | 12/1991 | Bäbler et al. | 264/22 |

Primary Examiner—Jan H. Silbaugh
Assistant Examiner—Brian J. Eastley
Attorney, Agent, or Firm—Harvey Fendelman; Thomas G. Keough

[57] ABSTRACT

A method of producing scintillation phosphor X-ray detector arrays using bulk materials and repetitive manufacturing techniques. The structures formed by this method may be used to detect x-rays, charged particles and neutral particles by converting the incident radiation into optical radiation. Detectors manufactured by the methods of this invention will produce better x-ray images and reduce the amount of radiation a medical patient or industrial target is subjected to.

21 Claims, 1 Drawing Sheet

METHOD FOR MANUFACTURING A HIGH RESOLUTION STRUCTURED X-RAY DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In general the present invention relates to methods for manufacturing high resolution x-ray detectors comprised of structured scintillation (fluorescent or photostimulable) phosphor which offer substantial x-ray stopping power.

The present x-ray detector technology consists of several detection methods each of which have limitations which reduce their effectiveness. X-ray screens composed of powder phosphor mixed with a binder are used in radiography; however, the thickness and thus the stopping power are limited since the screen material is optically self-attenuating and diffusive. The powder phosphors used are typically fluorescent scintillating phosphor although photostimulable phosphors (those which fluoresce after being excited by an optical source) have been used in x-ray screens.

Vapor deposited CsI:Na used in x-ray image intensifiers for real-time radiography also has limited thickness since light diffusion problems result in resolution loss. In addition, the phosphor deposition technique may result in structural stability problems beyond approximately 0.3 mm.

Cut, sawed and cleaved scintillation crystals which are used in Computer Tomography Scanners exhibit low spatial resolution. Scintillating glass or plastic fiber bundle x-ray and particle detectors used in high energy physics have poor stopping power per unit length and poor x-ray to optical conversion efficiency. The poor stopping power can degrade the spatial resolution of the detector. The poor optical conversion often requires the use of additional amplification to boost the signal strength prior to readout. An additional limitation is that as the diameter of a fiber decreases the ratio of core-to-cladding volume decreases. This further degrades the resolution and useful volume of a fiber bundle detector. The scintillating fiber bundles are not very useful for x-ray energies below 100 KeV. However, they transmit light efficiently and thus can be made very thick which results in substantial attenuation. They may also be bent or twisted so that a readout device is not directly behind the entrance face of the fiber bundle. A fiber bundle may also be constricted at one end to reduce the size of the image displayed.

The detectors described above are used in medical x-ray radiography, x-ray nondestructive testing and in high energy physics for particle detection. The scintillation materials used in those detectors, their x-ray-to-optical conversion efficiency, and their viable attenuation lengths often restrict the useful energy range of the individual detector.

U.S. Pat. No. 4,560,882 discloses the advantages of coating the phosphorescent material of an x-ray converter with a reflective substance to improve the performance. A multiple step process is disclosed in which single elements are coated and then assembled into 1-dimensional or 2-dimensional arrays.

This application discloses a method by which highly efficient x-ray converters may be mass produced using bulk materials and repetitive processes. X-ray detectors manufactured by this method can be tailored to meet stringent application requirements.

SUMMARY OF THE INVENTION

The present invention is directed to providing a method for manufacturing x-ray detection devices from x-ray scintillation phosphor materials that offer an inexpensive means of detecting x-rays (gamma rays) and other forms of radiation such as charged particles or neutrons. Scintillation phosphor materials offer superior stopping power and much higher optical conversion efficiency than scintillating glasses or plastic.

Several techniques are disclosed in accordance with the present invention for producing scintillating x-ray detectors which have high spatial resolution, as well as high stopping power and good optical output.

These techniques include but are not limited to: vapor deposition or extrusion of layers of scintillation phosphor material, separation of the layers into uniform strips, coating the sides of the strips with reflective material to form reflective channels, and cutting the reflective channels into uniform segments. For some applications, the segments can be stacked to form an array of channels in order to create a detector which has a specific cross-sectional area.

Structured phosphor detectors manufactured by the methods of this invention, combine the high stopping power and x-ray to optical conversion efficiency of scintillating phosphors with the light channeling and long path length capabilities of scintillating glass or plastic fibers.

The advantages provided by this invention over x-ray detectors described in prior art disclosures are that the method of this invention allows one-dimensional or two-dimensional phosphor arrays to be manufactured using bulk layers of material and repetitive production techniques. Layers of scintillation material are formed, a pattern of reflective surfaces are inserted into that layer, the layer is covered with a reflective coating, and the process is repeated until the final structure of a detector is formed. This method eliminates the need for large scale assembly and processing of individual pieces of material as disclosed in the prior art. Detectors manufactured by this method have superior stopping power, better optical output, and finer image resolution than the detectors produced by prior art methods. Multilayer arrays can be constructed using these techniques and detectors can be built to meet specific radiation requirements as to array size, shape, and length. The reflective channels can be compressed or expanded to reduce or magnify the image detected. Thicker, longer and more uniform x-ray detectors can be produced by these methods. Clearer, sharper and more detailed x-ray images can be obtained at lower radiation levels from detectors manufactured by the methods of the present invention. This reduces the amount of radiation required to pass through a patient or target in order to obtain information suitable for proper analysis.

An object of the invention is to disclose a method for mass producing x-ray detectors using bulk layers of scintillation phosphor material and repeatable production techniques to encase the phosphor in a thin reflective coating.

Another object of the invention is to disclose a method for manufacturing an x-ray detector composed of a series of separate channels of scintillation phosphor material wherein each channel is encased in a thin reflective coating.

An additional object of the invention is to provide a method of manufacturing an x-ray detector from scintillation phosphor material that has high optical conversion efficiency and superior radiation stopping power. This method provides the means to manufacture a detector composed of an array of several layers of channelized scintillating phosphor wherein each phosphor channel is encased in a thin reflective coating.

These and other objects of the invention will become more readily apparent from the ensuing specification when taken in conjunction with the drawings and appended claims.

DESCRIPTION OF THE PREFERRED EMBODIMENT

The method of the present invention for manufacturing an x-ray detector comprises creating a bulk layer of scintillation material and applying repeatable production techniques to convert the bulk material into an array of reflectively coated light conducting channels. The light created in each channel from the stimulation of an x-ray is reflected through the channel in a manner similar to the reflection of light in an optical fiber. This improves the probability that light generated within the scintillation material will reach the uncoated ends of the material. These reflectively coated sections of scintillation material are formed into arrays to create a detector. The initial reflective layer can be established by depositing a reflective coating on the bottom of a layer of phosphor material or by depositing the phosphor layer on an existing reflective layer. An advantage of using deposition methods when creating phosphor layers is that the thickness of the layers can be non uniform and/or the detector can be constructed on a non-planar surface. Thus, within the scope of the present invention, various x-ray source distribution patterns can be accommodated by appropriately designing the geometry of the detector. The application of reflective coatings was disclosed in U.S. Pat No. 4,560,882. This application discloses a method for forming single and multi-layer detectors using layers of scintillation material which may be formed by repetitive techniques.

Figure 1:
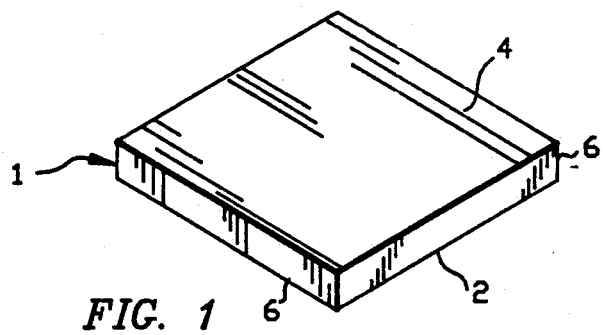
FIG. 1 is an isometric projection of a uniform flat sheet of scintillation material.

Referring now to the drawings, wherein like reference numerals designate like or similar parts throughout the several views, there is illustrated in FIG. 1 a flat layer 1 of scintillation material which has a bottom surface 2, top surface 4 and side surfaces 6. The thickness of layer 1 may be uniform or varied and is determined by the type of radiation detector desired such as: medical x-ray radiography, x-ray nondestructive industrial testing, or high energy particle detection. The thickness of layer 1 can range from less than 5 microns to several millimeters depending on the material used and the type of detector. Layer 1 of scintillation material is produced by various deposition techniques such as vapor deposition or extrusion through a long narrow aperture.

Figure 2:
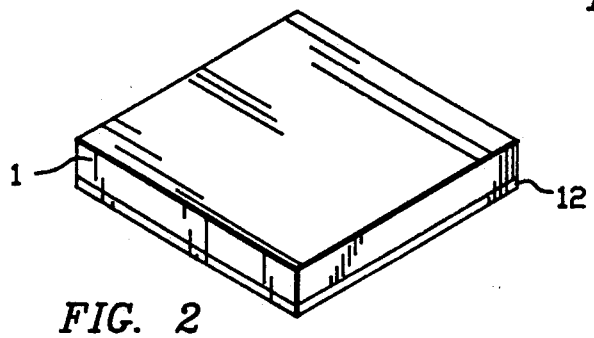
FIG. 2 depicts an isometric projection of a layer of scintillation material which has a thin reflective coating on the bottom surface.

FIG. 2 illustrates layer 1 after the application to surface 2 of the first reflective coating 12. Reflective coating 12 can be created by several methods:

a. Vapor depositing, pouring or spraying a thin coating of low index of refraction material on the surface of the scintillation phosphor material.
b. Diffusing a material with a low refractive index into the surface to cause a reflective boundary.
c. Bombarding the surface with a particle beam to change the refractive properties to produce a reflective layer.
d. Depositing a thin reflective metallic coating on the surface.
e. Applying a thin, diffusely reflective material such as white paint to the surface.

or f. Using various combinations of the above procedures to further improve reflectivity while providing optical isolation. For example method e. may be applied on top of the surface formed by method a. to improve the optical isolation. Another example would be applying method d. to increase the reflectivity after using method c. to create an initial reflective surface layer.

Figure 3:
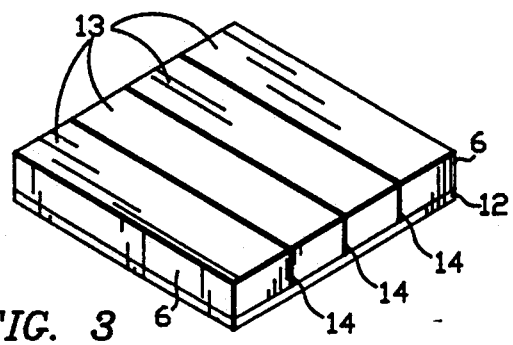
FIG. 3 is an isometric representation of a layer of scintillation material divided into a series of separate segments.

The next procedure after coating surface 2 of layer 1 is to separate layer 1 into uniform segments 13, as shown in FIG. 3. This can be done by any of the following procedures:

A. Separating layer 1 into uniform segments 13 by removing the scintillation phosphor material along boundaries 14 by cutting, sawing or milling.
B. Separating layer 1 into segments 13 by removing phosphor material along boundaries 14 using, for example, a laser beam, an electron beam or photoetching.
C. Diffusing a different material into layer 1 along boundaries 14 creating reflective surfaces between segments 13.
D. Bombarding layer 1 along boundaries 14 with a particle beam to create a reflective surface between segments 13.

Figure 4:
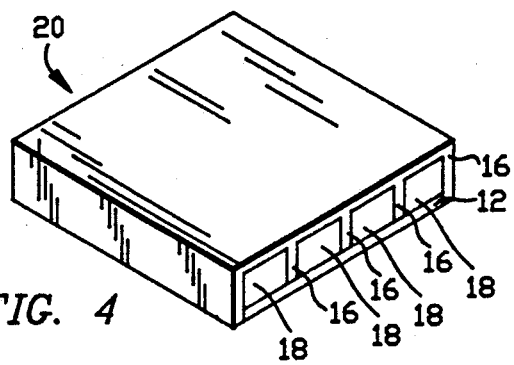
FIG. 4 is an isometric portrayal of a layer of channels of scintillation material covered by a thin reflective coating.
Figure 8:
FIG. 8 depicts a top view of reflectively coated channel of phosphor material which uses a uniform curved pattern to reduce the size and focus the image at one end of the channel.
Figure 5:
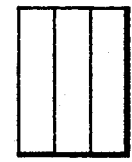
FIG. 5 illustrates a top view of a radiation detector which consists of a linear array of coated rectangular channels of scintillation material.
Figure 6:
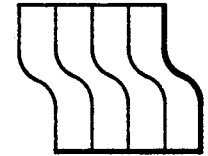
FIG. 6 represents a top view of a radiation detector array of curved channels of reflectively coated fluorescent material.
Figure 7:
FIG. 7 is a top view of a reflectively coated channel of scintillation material which is tapered at one end.
Figure 9:
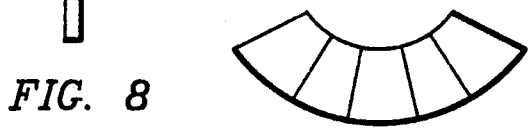
FIG. 9 represents top view of a uniform array of reflectively coated channels of scintillation material which is curved to fit a specific area or pattern.

After layer 1 has been separated into segments 13, an additional reflective surface 16 is applied to cover top surface 4 and side surfaces 6 (and to fill the voids of the exposed boundaries 13 when procedures A or B are used). This creates reflectively coated channels 18 of scintillation material as shown in FIG. 4. Surface 16 may be created using techniques a. through e. which were discussed with regard to creating the first reflective layer. The geometry of the reflective channels may be straight as shown in FIG. 5 or contain curves as shown in FIG. 6. The channels can even be tapered or focused as shown in FIGS. 7 & 8 or conformed to fit a specific area as shown in FIG. 9.

Figure 10:
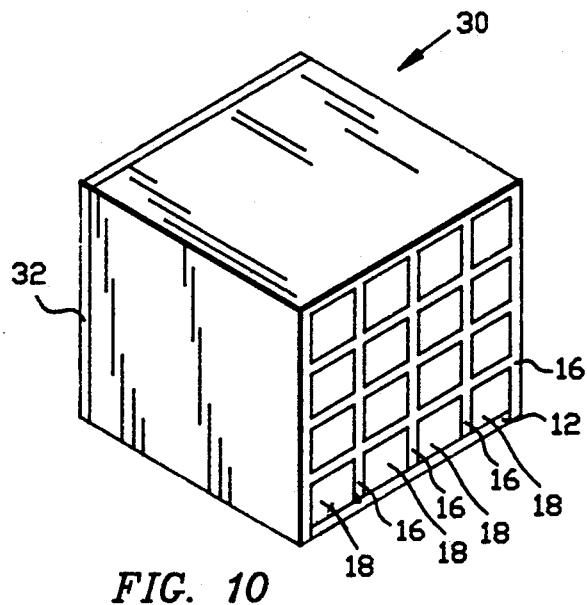
FIG. 10 depicts an isometric view of a radiation detector which consists of a two dimensional array of coated channels.

Once an array 20 of reflectively coated channels has been completed (as shown in FIG. 4), then a new layer 10 of scintillation material may be deposited on top of the array and the process of creating new reflectively coated channels may be repeated in order to form a two-dimensional array 30 comprising several layers of reflective channels, as shown in FIG. 10. After a detector array is formed, a reflective coating 32, as shown in FIG. 10, may be applied to one of the cut ends of the array (for some applications) in order to increase the optical signal directed toward the other end. In such a case the coating procedure would apply one of the methods of a. through e. above. Ionizing radiation would be incident on the cut face of the array for conventional imaging applications. For specialized applications such as time-of-flight imaging in high energy physics applications, radiation could be incident on the front or back wall of the array.

Figure 11:
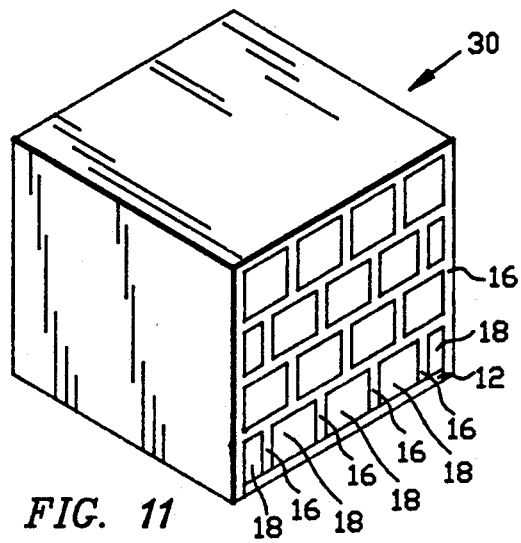
FIG. 11 is an isometric view of a radiation detector which consists of a two dimensional array of coated channels in which the adjacent channels are offset.

Channels in successive layers may be offset (as shown in FIG. 11); that is, they need not be aligned with the channels of the proceeding layer.

As an alternative, completed single layer arrays 20 (shown in FIG. 4) may be stacked to form a two dimensional (2-D) array 30 (as shown in FIG. 10). The 2-D array 30 or single layer array 20 is cut to a desired length determined by the type, energy spectrum, and intensity of the radiation source, the stopping power required and the image resolution of the desired detector. Typically the arrays are cut orthogonally to the channel boundaries; however, angles other than 90° may be employed.

The arrays also may be constructed from solid sheets of the scintillation phosphor of the appropriate thickness. The optical channel boundaries are then etched or diffused into the piece. After the additional reflective surfaces are applied, the single layer array 20 pieces can be abutted to form a larger 2-D array 30.

Obviously, many modifications and variations of the present invention are possible in light of the above teachings. It is therefore to be understood that within the scope of the appended claims, the invention can be practiced otherwise than as specifically described.

We claim:

1. A method of forming a structure comprising the steps of:
   (a) forming a layer of scintillation phosphor material comprising a bottom surface, a top surface, and side surfaces;
   (b) applying a thin reflective coating to said bottom surface, whereby the thin reflective coating is applied by the methods consisting of
   (i) vapor depositing, pouring or spraying a thin coating of low index of refraction material on said bottom surface;
   (ii) diffusing a material with a low refractive index into said bottom surface to cause a reflective boundary;
   (iii) bombarding said bottom surface with a particle beam to change the refractive properties to produce a reflective layer;
   (iv) depositing a thin reflective metallic coating on said bottom surface;
   (v) painting a thin, diffusely reflective material on said bottom surface; and
   (vi) combinations of (i), (ii), (iii), (iv), and (v);
   (c) forming a pattern in said layer by creating voids which separate said material into individual segments; and
   (d) depositing an additional reflective surface to fill said voids and form a thin reflective coating on said top and side surfaces to thereby form said structure.

2. The method of claim 1 further comprising the step of truncating said structure including said phosphor material.

3. The method of claim 1 wherein said voids created in step (c) are created by sawing.

4. The method of claim 1 wherein said voids created in step (c) are created by cutting.

5. The method of claim 1 wherein said voids created in step (c) are created by milling.

6. The method of claim 1 wherein said voids created in step (c) are created by laser beam etching.

7. The method of claim 1 wherein said voids created in step (c) are created by electron beam etching.

8. The method of claim 1 wherein said voids created in step (c) are created by photoetching.

9. The method of forming a layered structure comprising the steps of claim 1 and the additional steps of:
   (e) sequentially repeating steps (a), (c) and (d) to add additional layers of reflectively coated phosphorescent material on said top surface thin reflective coat to thereby form said layered structure; and
   (f) truncating said layered structure including said phosphor material.

10. A method of forming a structure comprising the steps of:
    (a) forming a layer of scintillation phosphor material comprising a bottom surface, a top surface, and side surfaces;
    (b) creating a thin reflective coating on said bottom surface;
    (c) forming a pattern in said layer by diffusing a substance into said material which creates reflective boundaries that separate said material into individual segments; and
    (d) creating an additional reflective surface to cover said boundaries and form a thin reflective coating on said top and side surfaces to thereby form said structure.

11. The method of claim 10 further comprising the step of truncating said structure.

12. The method of forming a layered structure comprising the steps of claim 10 and the additional steps of:
    (e) sequentially repeating steps (a), (c) and (d) to add additional layers of reflectively coated phosphorescent material on said top surface thin reflective coating to thereby form said layered structure; and
    (f) truncating said layered structure.

13. A method of forming a structure comprising the steps of:

(a) forming a layer of scintillation phosphor material comprising a bottom surface, a top surface, and side surfaces;
(b) applying a thin reflective coating to said bottom surface;
(c) forming a pattern in said layer by bombarding the top surface of said material with a particle beam to separate said material into individual segments to thereby create reflective boundaries; and
(d) creating an additional reflective coating to cover said boundaries and form a thin reflective coating on said top and side surfaces to thereby form said structure.

14. The method of claim 13 further comprising the step of truncating said structure.

15. The method of forming a layered structure comprising the steps of claim 13 and the additional steps of:
(e) sequentially repeating steps (a), (c) and (d) to add additional layers of reflectively coated phosphorescent material on said top surface thin reflective coating to thereby form said structure; and
(f) truncating said layered structure.

16. The method of claims 1, 10, or 13 wherein said reflective coating is composed of a low index of refraction material and formed by vapor deposition.

17. The method of claims 1, 10, or 13 wherein said reflective coating is composed of a low index of refraction material and formed by pouring.

18. The method of claims 1, 10, or 13 wherein said reflective coating is composed of a low index of refraction material and formed by spraying.

19. The method of claims 1, 10, or 13 wherein said reflective coating is composed of a metallic material.

20. The method of claims 1, 10, or 13 wherein said reflective coating is composed of a diffusely reflective material.

21. The method of claims 2, 9, 11, 12, 14, or 15 wherein said structure is truncated by cutting it orthogonally to said reflectively coated sides.

* * * * *

UNITED STATES PATENT AND TRADEMARK OFFICE
CERTIFICATE OF CORRECTION

PATENT NO. : 5,258,145
DATED : 11/2/93
INVENTOR(S) : Robert S. Nelson

It is certified that error appears in the above-identified patent and that said Letters Patent is hereby corrected as shown below:

In claim 1, column 5, line 65, change "the methods" to -- one of the methods selected from the group --.

Signed and Sealed this

Seventh Day of June, 1994

*Attest:*

BRUCE LEHMAN

*Attesting Officer*  *Commissioner of Patents and Trademarks*